May 3, 1927.
G. P. HENRY
TIRE CARRIER
Filed July 25, 1925
1,626,934
2 Sheets-Sheet 1
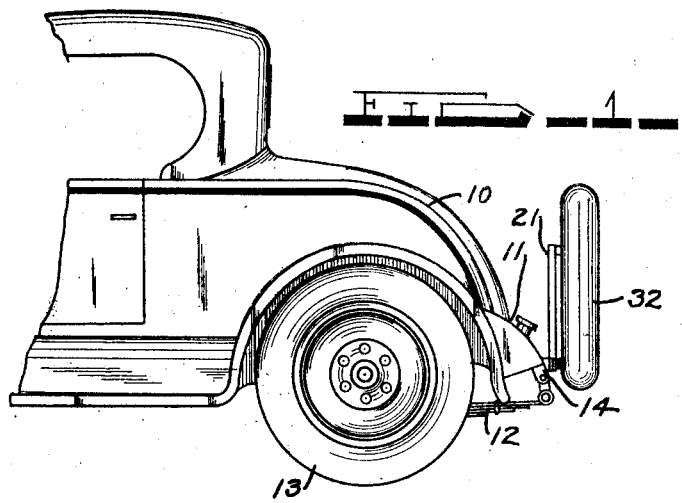
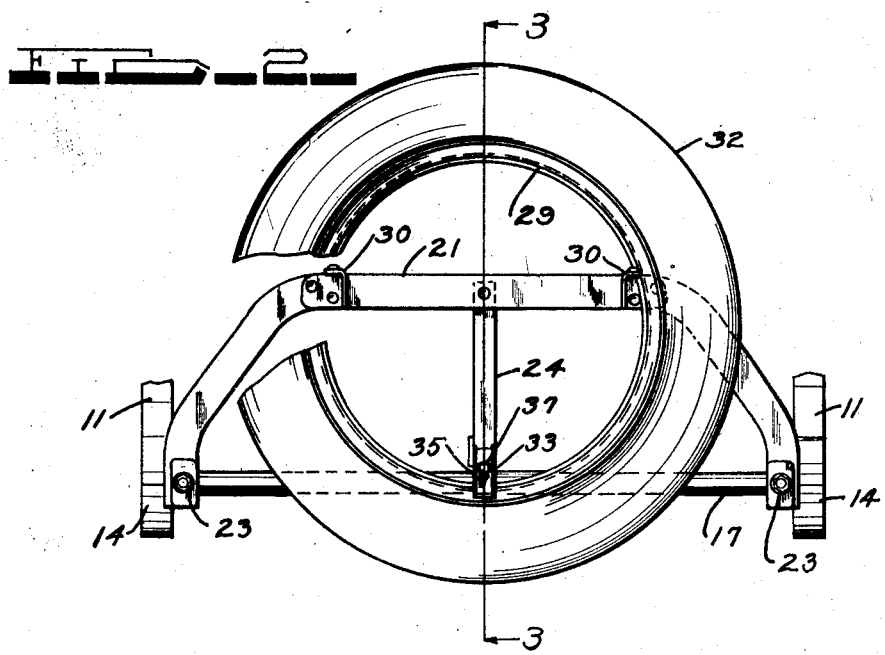
INVENTOR
GUY P. HENRY.
BY
ATTORNEY

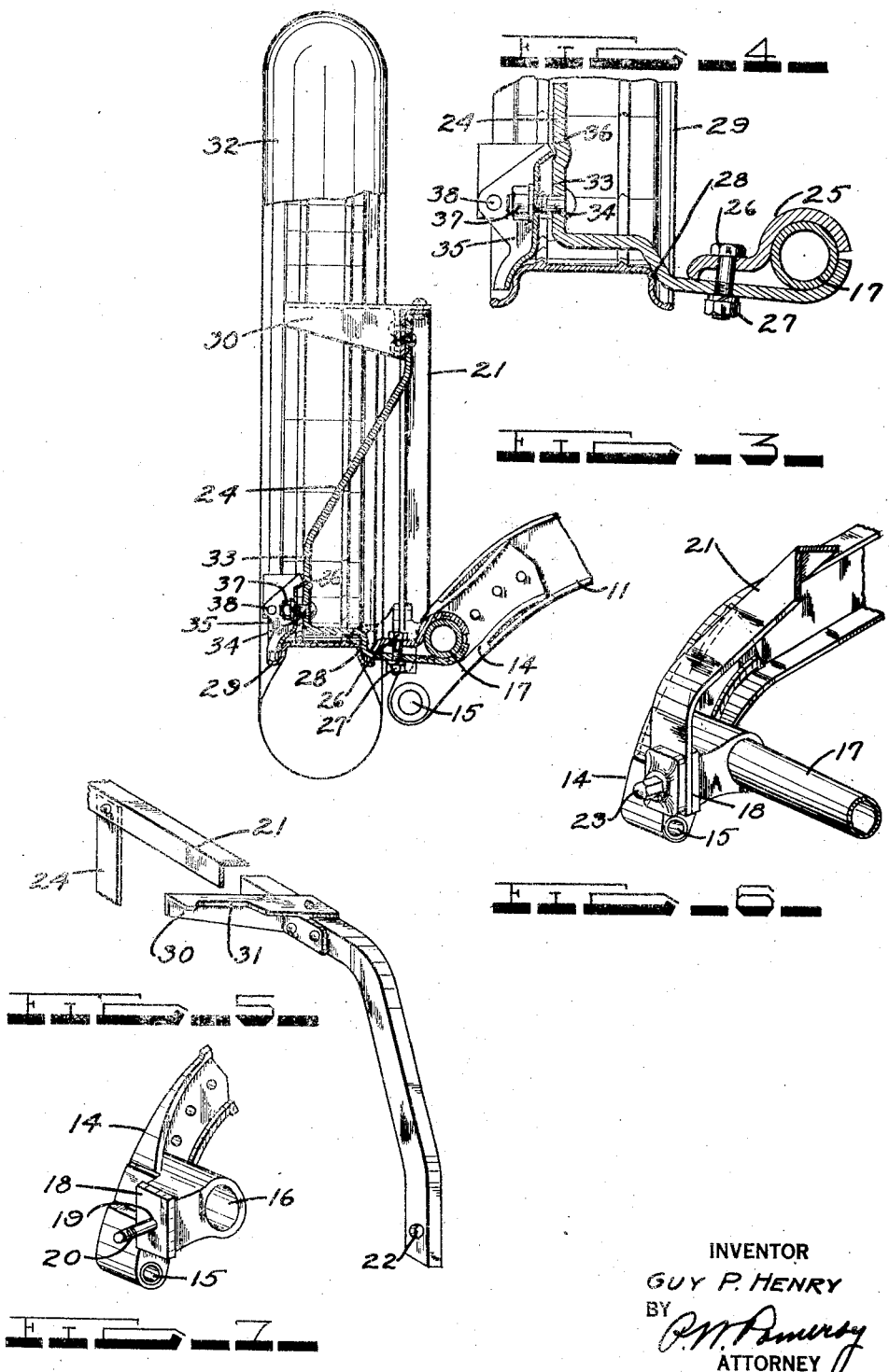

Patented May 3, 1927.

1,626,934

UNITED STATES PATENT OFFICE.

GUY P. HENRY, OF DETROIT, MICHIGAN, ASSIGNOR TO THE STUDEBAKER CORPORATION, OF SOUTH BEND, INDIANA, A CORPORATION OF NEW JERSEY.

TIRE CARRIER.

Application filed July 25, 1925. Serial No. 46,119.

This invention relates to means for carrying the spare tires and rims on motor vehicles, and the principal object is to provide a new and novel device of this class which is simple yet sturdy in construction and is easy and economical to manufacture.

Another object is to provide a tire and rim carrier having a one piece frame member to which two spaced supporting arms and a vertical brace are secured, the supporting arms taking substantially all the vertical load of the rim and tire, and the brace member being secured at its lower end to the frame cross tube to receive a clamping member for holding the tire and rim in fixed position.

A further object is to provide a tire carrier with a one piece, inverted U-shaped angle iron base member, the ends of which are adapted to be secured to brackets attached to the ends of the frame side members.

These being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, and in which like numerals refer to like parts throughout the several views.

Figure 1 is a side view showing the tire carrier of the present invention secured to a motor vehicle.

Figure 2 is an enlarged elevational plan view of the carrier shown in Figure 1 secured to the vehicle frame ends.

Figure 3 is an enlarged sectional view taken on the line 3—3 of Figure 2.

Figure 4 is an enlarged view of the bottom portion of Figure 3 more clearly showing the vertical brace member secured to the frame cross tube and also showing the clamping member secured thereto to hold the rim in position.

Figure 5 is a fragmentary perspective view of the angle shaped one-piece base member showing one of the rim supporting arms and the vertical brace member secured thereto.

Figure 6 is a fragmentary perspective view showing one of the carrier supporting brackets attached to a frame side member with one end of the one-piece base member secured to the face of this bracket.

Figure 7 is a perspective view of one of the brackets.

In the drawings a motor vehicle is illustrated as having a body 10, a frame 11, springs 12 and rear wheels 13. Fitted within and secured in a conventional manner to the rear end of each of the frame members 11 is the cast or forged bracket member 14 (see Figures 3, 6 and 7) which has a downwardly projecting eye portion provided with an opening 15 which receives a conventional spring shackle bolt to which the rear end of the spring 12 is secured, an opening 16 disposed horizontally crosswise of the vehicle which receives and in which is secured the tubular frame cross member 17, and a rearwardly projecting, vertically extending, flat face portion 18 provided with an opening 19 into which a suitable stud 20 is threaded.

The tire carrier as illustrated is formed with a main portion comprising an inverted U-shaped base or frame member 21, preferably constructed from sheet metal into any desired section, such as the angle section shown, and provided with openings 22 at its ends, which receive the studs 20 on the member 14, the ends seating against the flat vertical faces 18 and being secured thereagainst by nuts 23 threaded on the studs 20. Projecting rearwardly from the upper portion of the frame 21 are two spaced metal arms 30, preferably of stamped sheet metal, each of which is provided with a notch 31 of a size to suitably receive the tire rim 29, and which arms 30 support the weight of the rim 29 and tire 32. A piece of strip metal 24, which forms a third arm, is secured to the frame 21 substantially midway between the arms 30 and extends downwardly and rearwardly therefrom to a point above but adjacent to the lower rear edge of the rim 29. The member 24 extends forwardly adjacent the lower forward edge of the rim and is then bent downwardly to form an abutment 28 for the rear edge of the rim 29, and then extends forwardly to the tubular cross member 17 to which it is secured by means of a clamping bar 25, bolt 26 and nut 27.

The third arm or brace member 24 which is formed with an upwardly extending part 33 has secured thereto a rearwardly extending stud or bolt 34 which receives the clamping member 35. This clamping member 35, as shown most clearly in Figure 4, is preferably of pressed metal construction having its lower end bent slightly backwards to cause a wedging effect on the rim 29 to draw it tightly down in the notches 31, and its upper end is bent forwardly to engage with a groove 36 formed in the part 33 which thereby prevents misalignment of the clamp 35 with the part 33 and holds the body portion of the clamp 35 spaced away from the part 33 to obtain the proper clamping effect on the lower part of the rim 29 when this lower part is drawn forwardly by the nut 37 which is threaded onto the stud 34.

Suitable means, such as an aperture 38 in the clamp 35 matching a similar opening in the brace 24 through which a padlock may be passed, are preferably provided to prevent unauthorized displacement of the clamp 35 in order to remove the tire 32 and rim 29.

It will be apparent from the foregoing description that the construction described, provides a simple, efficient and neat appearing tire and rim carrier that is economical to manufacture.

Formal changes may be made in the specific embodiment of the invention described without departing from the spirit and substance of the broad invention, the scope of which is commensurate with the appended claims.

What I claim is:

1. In a motor vehicle, the combination with frame side members and a cross-member, means for supporting a spare rim thereon comprising an inverted U-shaped frame secured at its free ends to said side members, means on said U-shaped frame for supporting a rim, and a brace for said U-shaped frame rigidly connected to the central portion thereof and extending rearwardly and downwardly to receive a clamping member, the lower portion of said brace being bent forwardly and downwardly to provide a rim abutment.

2. In a motor vehicle, the combination with frame side members and a cross member therefor, a rim carrier comprising a continuous upwardly bowed member spanning said side members and secured thereto, rim seats secured to said bowed member, a brace member extending between said bowed member and said cross member, said brace comprising an upwardly extending end secured to said bowed member, a flat portion spaced from and substantially parallel with said end, an inwardly bent portion and an end substantially parallel with said bent portion secured to said cross member, said last-named end providing an abutment for a rim, and means secured to said flat portion for clamping the rim against said abutment.

Signed at Detroit, Michigan, U. S. A., this 21 day of July, 1925.

GUY P. HENRY.